United States Patent
Baek et al.

(10) Patent No.: US 10,514,006 B1
(45) Date of Patent: Dec. 24, 2019

(54) FUEL REFORMING SYSTEM AND METHOD FOR CONTROLLING TEMPERATURE OF A FUEL REFORMER

(71) Applicants: Hyundai Motor Company, Seoul (KR); Kia Motors Corporation, Seoul (KR)

(72) Inventors: Hong Kil Baek, Seoul (KR); Seung Woo Lee, Seoul (KR); Tae Won Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/184,388

(22) Filed: Nov. 8, 2018

(30) Foreign Application Priority Data

Jul. 11, 2018 (KR) .......................... 10-2018-0080560

(51) Int. Cl.
| | |
|---|---|
| F02B 75/12 | (2006.01) |
| F02M 26/35 | (2016.01) |
| F02M 26/36 | (2016.01) |
| F02B 43/12 | (2006.01) |
| F02M 21/02 | (2006.01) |
| F02M 26/34 | (2016.01) |

(52) U.S. Cl.
CPC ............. *F02M 26/35* (2016.02); *F02B 43/12* (2013.01); *F02M 21/0206* (2013.01); *F02M 26/34* (2016.02); *F02M 26/36* (2016.02)

(58) Field of Classification Search
CPC ........ F02M 26/36; F02M 26/35; F02M 26/02; F02M 26/23; F02M 26/52; Y02T 10/47
USPC ......................................... 123/1 A, 2, 3, 525
See application file for complete search history.

(56) References Cited

U.S. PATENT DOCUMENTS

| | | | | |
|---|---|---|---|---|
| 8,015,952 | B2 * | 9/2011 | Pursifull | F02B 43/10 |
| | | | | 123/2 |
| 8,613,263 | B2 * | 12/2013 | Leone | F01N 5/02 |
| | | | | 123/3 |
| 10,371,104 | B2 * | 8/2019 | Baek | F01N 3/0253 |
| 2010/0077734 | A1 * | 4/2010 | Shamis | F01N 3/0253 |
| | | | | 60/286 |
| 2013/0098008 | A1 * | 4/2013 | Mori | F01N 3/103 |
| | | | | 60/303 |
| 2015/0136047 | A1 * | 5/2015 | Hou | F02D 41/3035 |
| | | | | 123/3 |

FOREIGN PATENT DOCUMENTS

| | | |
|---|---|---|
| JP | 2010223142 A | 10/2010 |
| JP | 2017025758 A | 2/2017 |
| KR | 20070043238 A | 4/2007 |
| KR | 20170113955 A | 10/2017 |

* cited by examiner

*Primary Examiner* — John Kwon
(74) *Attorney, Agent, or Firm* — Slater Matsil, LLP (57) ABSTRACT

A fuel reformer includes a housing. A mixing portion is provided in the housing, the mixing portion being a space for mixing fuel supplied from the outside with an EGR gas. A reforming catalyst portion is provided on a side opposite the mixing portion and is configured to reform the mixed fuel and the EGR gas in the mixing portion. A first heater is disposed around an outer periphery of the housing surrounding the mixing portion. A second heater is disposed around an outer periphery of the housing surrounding the reforming catalyst portion. The first and second heaters are configured to transmit thermal energy to the fuel reformer.

18 Claims, 5 Drawing Sheets

FUEL REFORMING SYSTEM AND METHOD FOR CONTROLLING TEMPERATURE OF A FUEL REFORMER

CROSS-REFERENCE TO RELATED APPLICATIONS

This application claims the benefit of Korean Patent Application No. 10-2018-0080560, filed in the Korean Intellectual Property Office on Jul. 11, 2018, which application is hereby incorporated herein by reference.

TECHNICAL FIELD

The present invention relates to a fuel reforming system and method for controlling temperature of a fuel reformer.

BACKGROUND

Hydrogen, which is a material having most light and simple structure on earth, has physical and chemical characteristic of about six bn times of laminar flame velocity and about three times of lower heating value compared with gasoline. Accordingly, during combusting by properly mixing gasoline and hydrogen, combustion speed and combustion stability may be increased to improve thermal efficiency by expanding lean boundary or increasing supply amount of exhaust gas recirculation.

Meanwhile, a fuel reformer is a system generating hydrogen. The hydrogen is generated by reacting separate gasoline fuel supplied to the reformer with a catalyst in the reformer using thermal energy of high temperature exhaust gas exhausted from an engine.

The reforming catalyst is heated only by the thermal energy of the exhaust gas supplied to the fuel reformer. However, in the low speed, low load operation region where the exhaust gas temperature flowing into the fuel reformer is low, it is difficult to sufficiently ensure the activation temperature of the fuel reforming catalyst. Therefore, there is a problem that the reforming operation range is limited and the reforming efficiency is lowered.

The above information disclosed in this Background section is only for enhancement of understanding of the background of the invention and therefore it may contain information that does not form the prior art that is already known in this country to a person of ordinary skill in the art.

SUMMARY

Embodiments of the present invention relate to a fuel reforming system and a method for controlling temperature of a fuel reformer. Particular embodiments relate to a fuel reforming system and a method for controlling temperature of a fuel reformer which can activate a fuel reforming catalyst by controlling a fuel reformer temperature in a low speed and low load operation region.

Embodiments of the present invention have been made in an effort to provide a fuel reforming system and method for controlling temperature of a fuel reformer which can activate a fuel reforming catalyst by increasing the exhaust gas and the catalyst temperature in a fuel reformer in a low speed and low load operation region by providing a heater in a catalyst housing and a mixing portion of the fuel reformer.

A fuel reforming system according to an exemplary embodiment of the present invention includes an engine combusting reformed gas to generate mechanical power, an intake line connected with the engine to supply reformed gas and air to the engine, an exhaust line connected with the engine to circulate exhaust gas exhausted from the engine, a fuel reformer for converting the fuel mixed in the EGR gas into a reformed gas which is provided in an exhaust gas recirculation (EGR) line branching from the exhaust line, an additional fuel injector injecting additional fuel into the internal combustion engine is installed in, and mixes the EGR gas which is branched into the EGR line with the fuel, and a temperature controller for controlling a temperature of the fuel reformer, wherein the fuel reformer includes a housing, a mixing portion provided in the housing, the mixing portion being a space for mixing the fuel supplied from the outside with the EGR gas, a reforming catalyst portion provided on the other side of the mixing portion and reforming the mixed fuel and the EGR gas in the mixing portion, a first heater disposed around an outer periphery of the housing surrounding the mixing portion and transmitting thermal energy to the fuel reformer, and a second heater disposed around an outer periphery of the housing surrounding the reforming catalyst section and transmitting thermal energy to the fuel reformer.

The fuel reformer may further include a fuel injector installed at one side of the housing for supplying fuel to the mixing portion, and an EGR pipe connected to the mixing portion and through which the EGR gas flows.

The fuel reforming system according to an exemplary embodiment of the present invention may further include a compressor connected with the intake line and compresses and supply the reformed gas and air to the engine, and a compressor connected with the intake line and compresses and supply the reformed gas and air to the engine.

At the EGR line, an EGR cooler provided at a rear end of the fuel reformer for cooling the fuel and the reformed gas which the EGR gas is reformed through the fuel reformer, and an EGR valve provided at a rear end of the EGR cooler for adjusting flow rate of the reformed gas may be provided.

The temperature controller may control the first heater and the second heater to operate when the catalyst temperature of the fuel reformer is less than a minimum temperature for generating hydrogen.

The temperature controller may control the first heater and the second heater to stop operating when the catalyst temperature of the fuel reformer is equal to or higher than the hydrogen generation stabilization temperature.

A method for controlling temperature of a fuel reformer according to an exemplary embodiment of the present invention is for mixing an EGR gas passing through an exhaust gas recirculation (EGR) line with a fuel and reforming the fuel mixed in the EGR gas, and includes a first temperature detecting step of detecting a catalyst temperature of the fuel reformer, a first temperature comparison step of determining whether a catalyst temperature of the fuel reformer is less than a minimum temperature for generating hydrogen, a heater operation step of operating a first heater and a second heater provided around an outer periphery of the fuel reformer when the catalyst temperature of the fuel reformer is less than a minimum temperature for generating hydrogen, a second temperature detecting step of detecting a catalyst temperature of the fuel reformer, a second temperature comparison step of determining whether the catalyst temperature of the fuel reformer is equal to or higher than a hydrogen generation stabilization temperature, and a heater operation stop step for stopping the first heater and the second heater when the catalyst temperature of the fuel reformer is equal to or higher than the hydrogen generation stabilization temperature.

The minimum temperature for the hydrogen generation may be in the range of 350° C. to 450° C.

The hydrogen generation stabilization temperature may be in the range of 500° C. to 520° C.

According to an exemplary embodiment of the present invention, the reforming operation region can be enlarged by increasing the temperature of the reformed gas and the reforming catalyst by supplementing thermal energy in the fuel reformer by using a heater.

Further, by increasing the amount of hydrogen generation, the fuel reforming efficiency and fuel consumption can be improved.

DETAILED DESCRIPTION OF ILLUSTRATIVE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

Now, a fuel reforming system and a fuel reformer according to an exemplary embodiment of the present invention will be described with reference to FIGS. 1 and 2.

Figure 1:
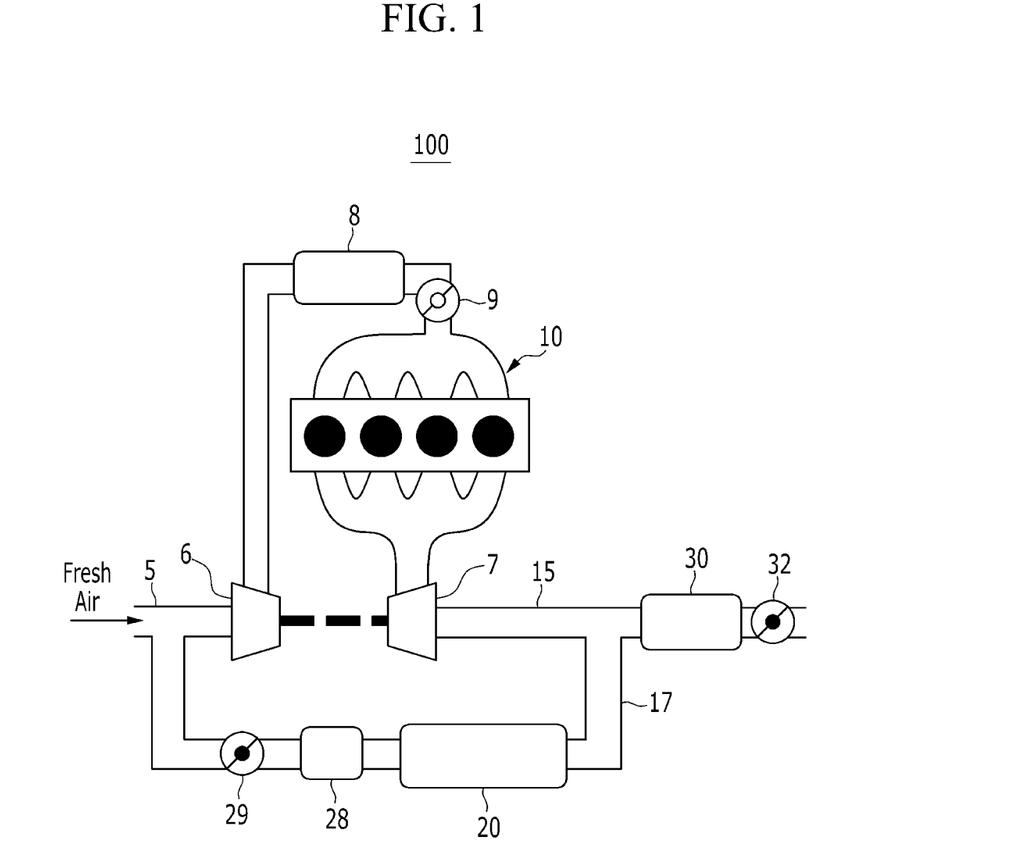
FIG. 1 is a schematic view illustrating a fuel reforming system according to an exemplary embodiment of the present invention.
Figure 2:
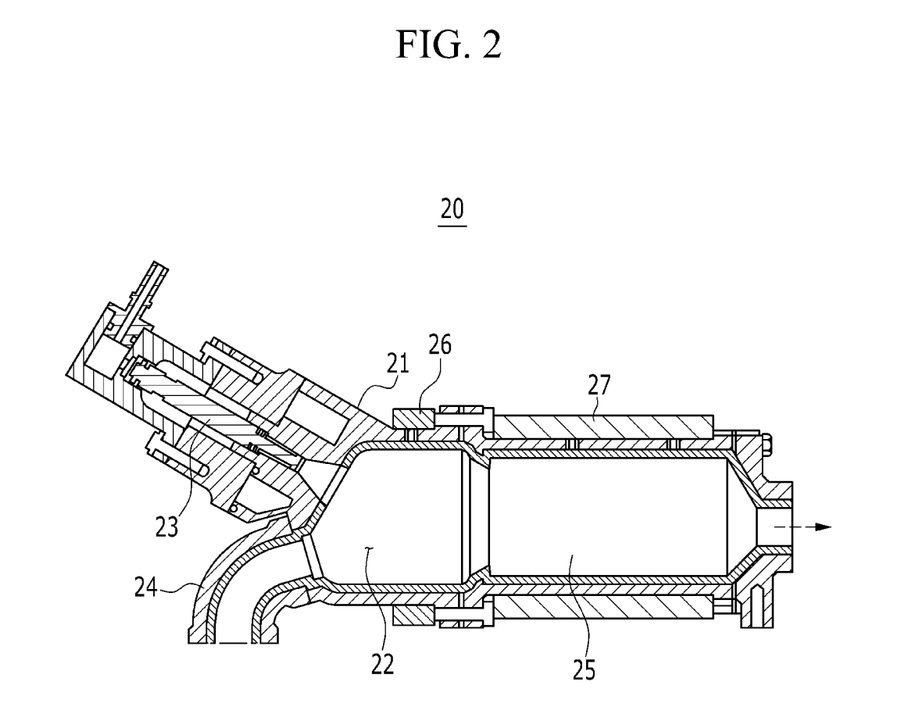
FIG. 2 is a schematic view illustrating a fuel reformer according to an exemplary embodiment of the present invention.

FIG. 1 is a schematic view illustrating a fuel reforming system according to an exemplary embodiment of the present invention, and FIG. 2 is a schematic view illustrating a fuel reformer according to an exemplary embodiment of the present invention.

Referring to FIG. 1, a reforming system 100 includes an engine 10, an intake line 5, an exhaust line 15, a fuel reformer 20, and a temperature controller (not illustrated).

The engine 10 burns air/fuel mixture in which fuel and air are mixed so as to convert chemical energy into mechanical energy. The engine 10 is connected to an intake manifold so as to receive the air in a combustion chamber, and is connected to an exhaust manifold such that exhaust gas generated in combustion process is gathered in the exhaust manifold and is exhausted to the exterior. An injector is mounted in the combustion chamber so as to inject the fuel into the combustion chamber.

A diesel engine is exemplified herein, but a lean-burn gasoline engine may be used. In a case that the gasoline engine is used, the air/fuel mixture flows into the combustion chamber through the intake manifold, and a spark plug is mounted at an upper portion of the combustion chamber.

In addition, the engines having various compression ratios, preferably a compression ratio lower than or equal to 16.5, may be used.

The intake line 5 is connected with entrance of the engine 10 to supply reformed gas and air to the engine 10, and the exhaust line 15 is connected with exit of the engine 10 to circulate exhaust gas exhausted from the engine 10.

A portion of the exhaust gas exhausted from the engine is supplied to the engine 10 through the EGR line 17. Also, the EGR line 17 is connected with the intake manifold so that combustion temperature is controlled by mixing a portion of the exhaust gas with air. This combust temperature control is conducted by adjusting exhaust gas amount supplied to the intake manifold. Accordingly, EGR valve 29 adjusting flow rate of the reformed gas may be installed at the EGR line 17.

The fuel reformer 20 is provided in an exhaust gas recirculation (EGR) line 17 branching from the exhaust line 15, mixes the EGR gas which is branched into the EGR line 17 with the fuel, and reforms the fuel mixed in the EGR gas into a reformed gas. The fuel reformer 20 may be provided with a fuel injector 23 for additionally injecting fuel into the fuel reformer 20.

As shown in FIG. 2, the fuel reformer 20 may include a housing 21, a mixing portion 22 provided in the housing, the mixing portion being a space for mixing the fuel supplied from the outside with the EGR gas, a fuel injector 23 for supplying fuel to the mixing portion 22, an EGR pipe 24 connected to the mixing portion 22 to introduce the EGR gas into the mixing portion 22, and a reforming catalyst portion 25 for reforming the mixed fuel and EGR gas in the mixing portion 22. Meanwhile, a flow rate control valve (not illustrated) for regulating the flow rate of the EGR gas passing through the EGR pipe 24 may be installed in the EGR pipe 24.

The mixing portion 22 is provided in the housing 21 and serves as a space for mixing the fuel supplied from the outside through the fuel injector 23 and the EGR gas introduced from the EGR pipe 24.

The fuel injector 23 and the EGR pipe 24 are installed on one side of the mixing portion 22 and the reforming catalyst portion 25 is connected to the other side of the mixing portion 22, that is, the fuel injector 23 and the EGR pipe 24 are on the opposite side, and reforms the mixed fuel and the EGR gas in the mixing portion 22.

Meanwhile, a first heater 26 for transmitting thermal energy to the fuel reformer 20 is installed on the outer circumference of the housing 21 surrounding the mixing portion 22 and a housing 21 is provided with a second heater 27 for transmitting thermal energy to the fuel reformer 20.

Power is supplied to the first heater 26 and the second heater 27 by a temperature controller (not illustrated) and thermal energy is supplied from the outside of the mixing portion 22 and the reforming catalyst portion 25 to the fuel reformer 20. The temperature controller may control whether the first heater 26 and the second heater 27 are operated simultaneously or independently of each other.

The temperature controller may control the first heater 26 and the second heater 27 to operate when the catalyst temperature of the fuel reformer 20 is less than the minimum temperature for generating hydrogen, and control the first heater 26 and the second heater 27 to stop operating when the temperature is equal to or higher than the hydrogen generation stabilization temperature.

Meanwhile, the fuel reforming system 100 according to an exemplary embodiment of the present invention may further include a compressor 6 connected with the intake line 5 and compresses the reformed gas and air to supply to the engine 10, and a turbine 7 connected with the exhaust line 15 and rotates by the exhaust gas to generate power.

Also, the reforming system may include an intercooler 8 connected with the compressor 6 and cooling air and reformed gas flowed into the intake line 5 of the engine 10 again, and a throttle valve 9 adjusting flow rate of the air and reformed gas.

An exhaust pressure control valve 32 adjusting flow rate of the exhaust gas may be provided at a rear end of the catalyst 30 in the exhaust line 15.

Meanwhile, at the EGR line 17, an EGR cooler 28 cooling the reformed gas, and an EGR valve 29 disposed at a rear end of the EGR cooler 28 for adjusting flow rate of the reformed gas may be installed.

At this time, the fuel reformer 20 may be installed in front of the EGR cooler 28 of the EGR line 17.

Figure 3:
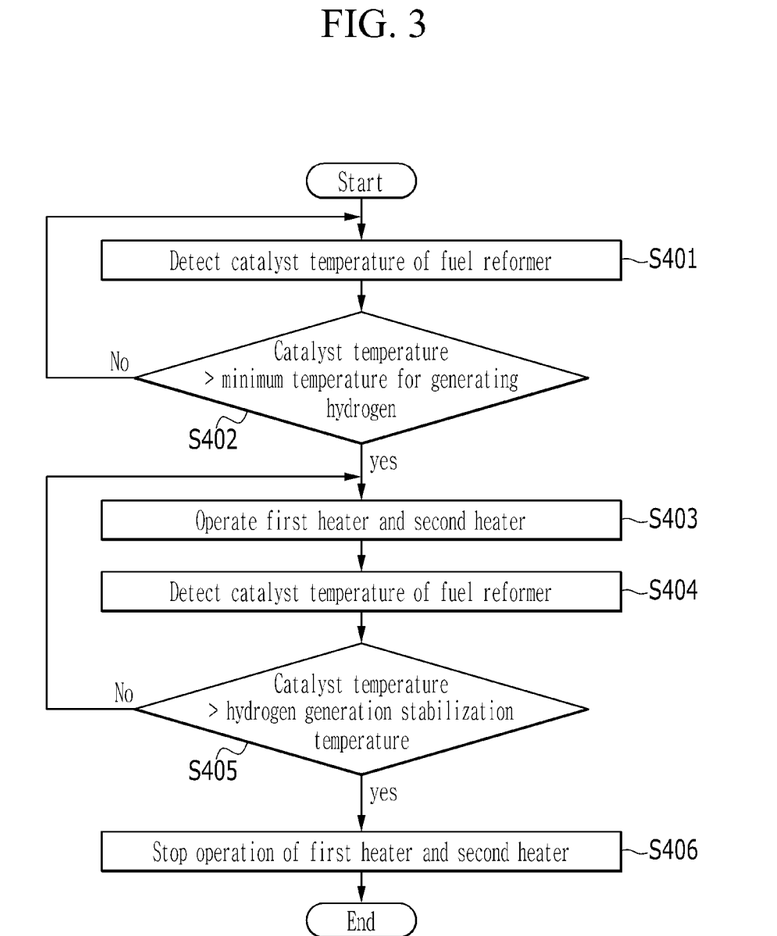
FIG. 3 is a flow chart illustrating a method for controlling temperature of a fuel reformer according to an exemplary embodiment of the present invention.
Figure 4:
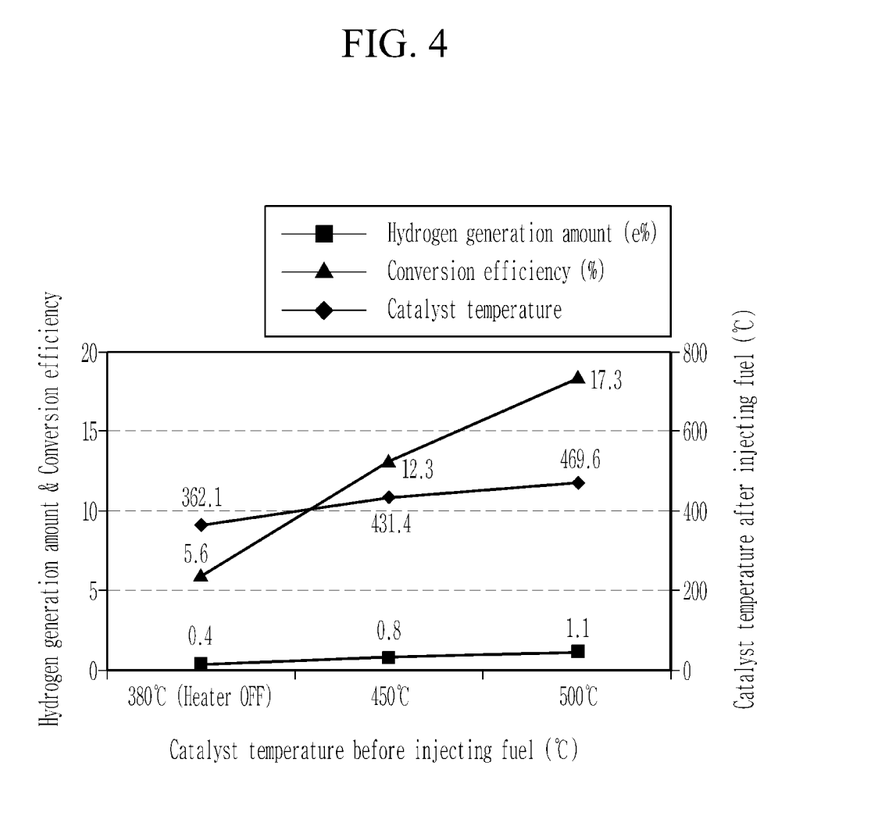
FIG. 4 is a graph showing the hydrogen generation amount and the hydrogen conversion efficiency in the fuel reformer according to the operation of the heater in the fuel reforming system according to an exemplary embodiment of the present invention.
Figure 5:
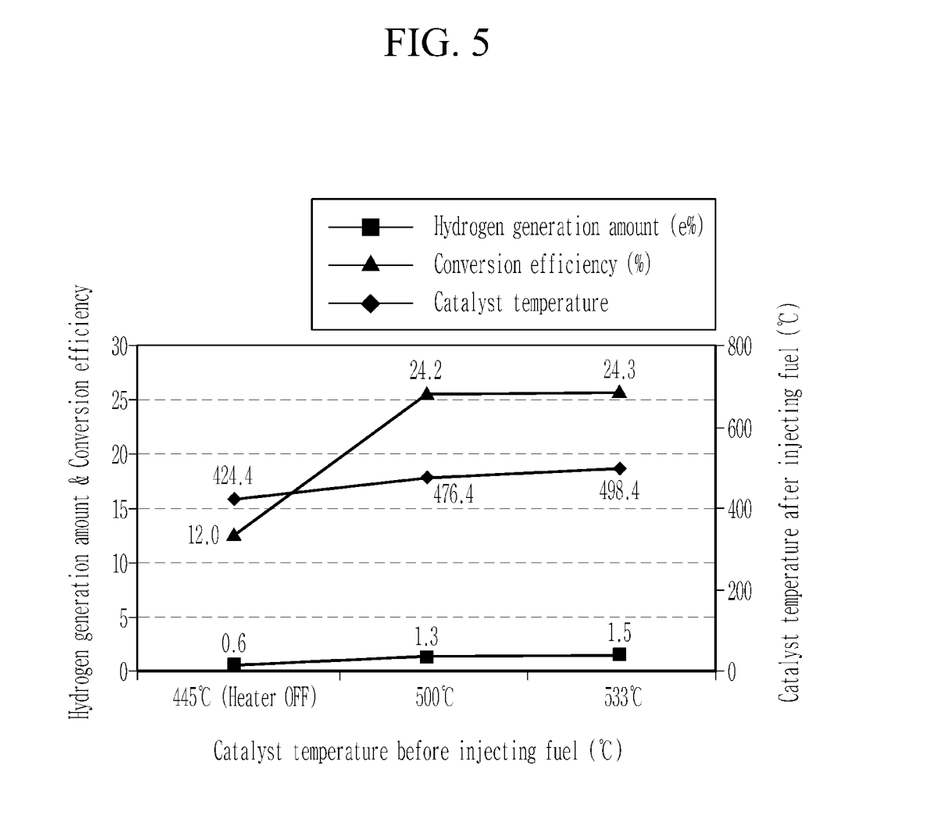
FIG. 5 is a graph showing the hydrogen generation amount and the hydrogen conversion efficiency in the fuel reformer according to the operation of the heater in the fuel reforming system according to an exemplary embodiment of the present invention.

FIG. 3 is a flow chart illustrating a method for controlling temperature of a fuel reformer according to an exemplary embodiment of the present invention, and FIGS. 4 and 5 are graphs showing the hydrogen generation amount and the hydrogen conversion efficiency in the fuel reformer according to the operation of the heater in the fuel reforming system according to an exemplary embodiment of the present invention.

Referring to FIG. 3, a method for controlling temperature of a fuel reformer 20 for mixing an EGR gas passing through an exhaust gas recirculation (EGR) line 17 with a fuel and reforming the fuel mixed in the EGR gas includes detecting a catalyst temperature of the fuel reformer 20 S401.

Then, whether a catalyst temperature of the fuel reformer is less than a minimum temperature for generating hydrogen is determined S402. At this time, the minimum temperature for the hydrogen generation may be in the range of about 350° C. to about 450° C.

Then, a first heater 26 and a second heater 27 provided around an outer periphery of the fuel reformer 20 are controlled to operate when the catalyst temperature of the fuel reformer 20 is less than a minimum temperature for generating hydrogen S403.

Then, a catalyst temperature of the fuel reformer 20 is detected S404, and whether the catalyst temperature of the fuel reformer 20 is equal to or higher than a hydrogen generation stabilization temperature is determined S405. At this time, the hydrogen generation stabilization temperature may be in the range of about 500° C. to about 520° C.

Then, the first heater 26 and the second heater 27 are controlled to stop when the catalyst temperature of the fuel reformer is equal to or higher than the hydrogen generation stabilization temperature S406.

Referring to FIG. 4, under the condition that the engine 10 has a revolutions per minute (RPM) of 2,000 rpm, a braking mean effective pressure (BMEP) of 4.7 bar, the exhaust gas recirculation rate is 15%, the steam to carbon ratio (SCR) is 1.7%, and the gas flow rate (GHSV) is 22,000/h, when catalyst temperature of the fuel reformer 20 is raised to 500° C. by operating the first heater 26 and the second heater 27 at the catalyst temperature of 380° C. of the fuel reformer 20 when the first heater 26 and the second heater 27 are not operating, the hydrogen generation was increased from 0.4e % to 1.1e %, and the hydrogen conversion efficiency was improved from 50.6% to 17.3%.

Further, referring to FIG. 5, under the condition that the engine 10 has the RPM of 2,000 rpm, the BMEP of 6 bar, the EGR rate is 19%, the SCR is 2.7%, and the GHSV is 33,000/h, when catalyst temperature of the fuel reformer 20 is raised to 500° C. by operating the first heater 26 and the second heater 27 at the catalyst temperature of 445° C. of the fuel reformer 20 when the first heater 26 and the second heater 27 are not operating, the hydrogen generation was increased from 0.6e % to 1.3e %, and the hydrogen conversion efficiency was improved from 12% to 24.2%.

However, when the catalyst temperature of the fuel reformer 20 is raised from 500° C. to 533° C., the hydrogen generation amount was increased only from 1.3e % to 1.5e %, and the hydrogen conversion efficiency was improved only from 24.2% to 24.3%. That is, when the catalyst temperature of the fuel reformer 20 is raised to about 520° C. or more, it can be seen that the hydrogen generation amount and the hydrogen conversion efficiency are not greatly increased. From the experimental results, it can be confirmed that the hydrogen generation stabilization temperature is about 500° C. to about 520° C.

Like this, according to an exemplary embodiment of the present invention, the reforming operation region can be enlarged by increasing the temperature of the reformed gas and the reforming catalyst by supplementing thermal energy in the fuel reformer by using a heater.

Further, by increasing the amount of hydrogen generation, the fuel reforming efficiency and fuel consumption can be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A fuel reforming system, comprising:
   an engine configured to combust reformed gas to generate mechanical power;
   an intake line connected with the engine to supply reformed gas and air to the engine;

an exhaust line connected with the engine to circulate exhaust gas exhausted from the engine;

an exhaust gas recirculation (EGR) line branching from the exhaust line;

a fuel reformer configured to convert the fuel mixed in EGR gas into the reformed gas; and a temperature controller configured to control a temperature of the fuel reformer, wherein the fuel reformer includes:

a housing;

an additional fuel injector configured to inject additional fuel into the engine, wherein fuel reformer is configured to mix the EGR gas which is branched into the EGR line with the fuel;

a mixing portion provided in the housing, the mixing portion being a space for mixing the fuel supplied from the outside with the EGR gas;

a reforming catalyst portion provided on a side opposite the mixing portion and configured to reform the mixed fuel and the EGR gas in the mixing portion;

a first heater disposed around an outer periphery of the housing surrounding the mixing portion, the first heater configured to transmit thermal energy to the fuel reformer; and a second heater disposed around an outer periphery of the housing surrounding the reforming catalyst portion, the second heater configured to transmit thermal energy to the fuel reformer.

2. The fuel reforming system of claim 1, wherein the fuel reformer further comprises:

a fuel injector installed at one side of the housing for supplying fuel to the mixing portion; and an EGR pipe connected to the mixing portion and through which the EGR gas flows.

3. The fuel reforming system of claim 1, further comprising:

a first compressor connected with the intake line and configured to compress and supply the reformed gas and air to the engine; and a second compressor connected with the intake line and configured to compress and supply the reformed gas and air to the engine.

4. The fuel reforming system of claim 1, wherein, at the EGR line, an EGR cooler is provided at a rear end of the fuel reformer for cooling the fuel and the reformed gas which the EGR gas is reformed through the fuel reformer.

5. The fuel reforming system of claim 4, wherein, at the EGR line, an EGR valve is provided at a rear end of the EGR cooler for adjusting a flow rate of the reformed gas.

6. The fuel reforming system of claim 1, wherein the temperature controller is configured to control the first heater and the second heater to operate when a catalyst temperature of the fuel reformer is less than a minimum temperature for generating hydrogen.

7. The fuel reforming system of claim 6, wherein the temperature controller is configured to control the first heater and the second heater to stop operating when the catalyst temperature of the fuel reformer is equal to or higher than a hydrogen generation stabilization temperature.

8. A method for controlling temperature of a fuel reformer for mixing an EGR gas passing through an exhaust gas recirculation (EGR) line with a fuel and reforming the fuel mixed in the EGR gas, the method comprising:

detecting a first catalyst temperature of the fuel reformer;

comparing the first catalyst temperature of the fuel reformer with a minimum temperature for generating hydrogen to determine that the first catalyst temperature of the fuel reformer is less than the minimum temperature for generating hydrogen;

operating a first heater and a second heater provided around an outer periphery of the fuel reformer in response to determining that the first catalyst temperature of the fuel reformer is less than the minimum temperature for generating hydrogen;

detecting a second catalyst temperature of the fuel reformer after operating the first heater and the second heater;

comparing the second catalyst temperature of the fuel reformer with a hydrogen generation stabilization temperature to determine that the second catalyst temperature of the fuel reformer is equal to or higher than the hydrogen generation stabilization temperature; and stopping the first heater and the second heater in response to determining that the second catalyst temperature of the fuel reformer is equal to or higher than the hydrogen generation stabilization temperature.

9. The method of claim 8, wherein the minimum temperature for the minimum temperature for generating hydrogen is in the range of 350° C. to 450° C.

10. The method of claim 9, wherein the hydrogen generation stabilization temperature is in the range of 500° C. to 520° C.

11. The method of claim 8, wherein the hydrogen generation stabilization temperature is in the range of 500° C. to 520° C.

12. A fuel reformer, comprising:

a housing;

a mixing portion provided in the housing, the mixing portion being a space for mixing fuel supplied from the outside with an EGR gas;

a reforming catalyst portion provided on a side opposite the mixing portion and configured to reform the mixed fuel and the EGR gas in the mixing portion;

a first heater disposed around an outer periphery of the housing surrounding the mixing portion, the first heater configured to transmit thermal energy to the fuel reformer; and a second heater disposed around an outer periphery of the housing surrounding the reforming catalyst portion, the second heater configured to transmit thermal energy to the fuel reformer.

13. The fuel reformer of claim 12, wherein the first heater and the second heater are controlled to be operated when a catalyst temperature of the fuel reformer is less than a minimum temperature for generating hydrogen.

14. The fuel reformer of claim 13, wherein the minimum temperature for the minimum temperature for generating hydrogen is in the range of 350° C. to 450° C.

15. The fuel reformer of claim 12, wherein the first heater and the second heater are controlled to not be operated when a catalyst temperature of the fuel reformer is equal to or higher than a hydrogen generation stabilization temperature.

16. The fuel reformer of claim 15, wherein the hydrogen generation stabilization temperature is in the range of 500° C. to 520° C.

17. The fuel reformer of claim 12, wherein the fuel reformer further comprises:

a fuel injector installed at one side of the housing for supplying fuel to the mixing portion; and an EGR pipe connected to the mixing portion and through which the EGR gas flows.

18. The fuel reformer of claim 12, wherein an EGR cooler is provided at a rear end of the fuel reformer for cooling the fuel and an EGR valve is provided at a rear end of the EGR cooler for adjusting a flow rate of gas.

\* \* \* \* \*